(12) United States Patent
Ito et al.

(10) Patent No.: US 8,876,045 B2
(45) Date of Patent: Nov. 4, 2014

(54) AIRCRAFT ACTUATOR CONTROL APPARATUS

(75) Inventors: Koji Ito, Gifu (JP); Toshiaki Tanaka, Gifu (JP)

(73) Assignee: Nabtesco Corporation, Tokyo (JP)

( * ) Notice: Subject to any disclaimer, the term of this patent is extended or adjusted under 35 U.S.C. 154(b) by 546 days.

(21) Appl. No.: 13/195,337

(22) Filed: Aug. 1, 2011

(65) Prior Publication Data

US 2012/0025015 A1 Feb. 2, 2012

(30) Foreign Application Priority Data

Aug. 2, 2010 (JP) ................................. 2010-173503

(51) Int. Cl.
*B64C 13/36* (2006.01)
*B64C 13/40* (2006.01)
*B64F 5/00* (2006.01)

(52) U.S. Cl.
CPC ............... *B64F 5/0045* (2013.01); *B64C 13/40* (2013.01)
USPC ........................................ 244/99.6; 244/226

(58) Field of Classification Search
USPC ......... 244/99.2, 99.5, 99.6, 99.7, 226; 91/437
See application file for complete search history.

(56) References Cited

U.S. PATENT DOCUMENTS

| | | | |
|---|---|---|---|
| 4,522,109 A | 6/1985 | Marchi et al. | |
| 4,905,933 A | 3/1990 | Ako | |
| 5,343,703 A | 9/1994 | Kamimura | |
| 6,186,044 B1 * | 2/2001 | Hajek et al. | 91/437 |
| 6,625,982 B2 * | 9/2003 | Van Den Bossche et al. | 60/403 |
| 6,685,138 B1 * | 2/2004 | Krantz | 244/99.5 |
| 7,600,715 B2 * | 10/2009 | Matsui | 244/99.6 |
| 2002/0121087 A1 | 9/2002 | Van Den Bossche et al. | |
| 2010/0116929 A1 | 5/2010 | Hejda | |

FOREIGN PATENT DOCUMENTS

| | | |
|---|---|---|
| JP | S64-41498 A | 2/1989 |
| JP | H06-144385 A | 5/1994 |
| JP | H09-144713 A | 6/1997 |
| JP | 2003-040199 A | 2/2003 |
| JP | 2004-100727 A | 4/2004 |
| JP | 2006-199296 A | 8/2006 |

OTHER PUBLICATIONS

An Office Action; "Notice of Reason for Rejection," issued by the Japanese Patent Office on Feb. 26, 2014, which corresponds to Japanese Patent Application No. 2010-173503 and is related to U.S. Appl. No. 13/195,337; with English language concise explanation.

* cited by examiner

*Primary Examiner* — Brian M O'Hara
(74) *Attorney, Agent, or Firm* — Studebaker & Brackett PC

(57) ABSTRACT

A plurality of hydraulically operated actuators that drive a control surface and a plurality of control systems that respectively control the operation of the actuators are included. Each of the control systems includes a control valve, a state switching valve and a test orifice circuit. The test orifice circuit includes a test orifice used for testing the performance of an orifice. The state switching valve is provided such that its position can be switched between an actuator connection position, a damping position and a test orifice position.

5 Claims, 7 Drawing Sheets

AIRCRAFT ACTUATOR CONTROL APPARATUS

CROSS-REFERENCE TO RELATED APPLICATIONS

This application claims priority to Japanese Patent Application No. 2010-173503. The entire disclosure of Japanese Patent Application No. 2010-173503 is hereby incorporated herein by reference.

BACKGROUND OF THE INVENTION

1. Field of the Invention

The present invention relates to an aircraft actuator control apparatus including a plurality of hydraulically operated actuators that drive a control surface of an aircraft and a plurality of control systems that respectively control the operation of the plurality of actuators.

2. Description of Related Art

Conventionally, aircraft actuator control apparatuses are used that include a plurality of hydraulically operated actuators that drive a control surface of an aircraft and a plurality of control systems that respectively control the operation of the plurality of actuators. A known example of such an aircraft actuator control apparatus is the aircraft actuator control apparatus disclosed in JP 2003-40199A.

In the aircraft actuator control apparatus disclosed in JP 2003-40199A, control systems each including control valves (a first control valve 351, a second control valve 352) and a state switching valve (a damping delivery valve 357) are provided for each actuator. The control valves are configured to control the operation of each actuator by switching between the paths of pressure oil that is supplied to and discharged from a pair of oil chambers in the actuator. The state switching valve, which is installed between the control valves and the actuator so as to connect the control valves to the actuator, includes an orifice that can be in communication with the pair of oil chambers of the actuator, and is configured to switch the operating state of the actuator.

The above-described state switching valve is provided such that its position can be switched between a position to connect the actuator to the control valves such that pressure oil flows between each of the pair of oil chambers of the actuator and the control valves and a position in which the pressure oil discharged from the pair of oil chambers can pass through the above-described orifice. Note that in a state where the state switching valve is switched to a position in which pressure oil flows between the actuator and the control valves, the supply path and the discharge path of the pressure oil to and from the pair of oil chambers are switched by the control valves, and thereby the operation of the actuator is controlled. On the other hand, in a state where the state switching valve is switched to a position in which the pressure oil discharged from the pair of oil chambers can pass through the orifice, the pair of oil chambers are in communication via this orifice, and thereby the damping function is fulfilled.

Also, the pressure oil is supplied to the plurality of actuators from the respective aircraft central hydraulic power sources that are configured as different systems. Then, if a loss or degradation in the function occurs in the hydraulic power source that supplies the pressure oil to one of the actuators, the state switching valve corresponding to that actuator is switched to the position to provide communication between the pair of oil chambers via the orifice. Accordingly, the above-described damping function is fulfilled, and thereby the actuator that experiences a degradation or the like in the function of the corresponding hydraulic power source operates so as to follow an external force exerted on the control surface. This can prevent an operation to impede the operation of an actuator for which a loss or the like in the function of the hydraulic power source has not occurred and prevent an abnormal operation, including, for example, excessive movement of the control surface, such as flutter.

SUMMARY OF THE INVENTION

In the aircraft actuator control apparatus disclosed in JP 2003-40199A, a control system including a state switching valve and a hydraulic circuit connecting to an actuator and the state switching valve is required to ensure normal operation and to always fulfill normal damping function. Therefore, a test to check whether the normal operation of the control system in ensured is necessary.

As the above-described test, it is possible to perform a test in which test pressure sensors are installed respectively corresponding to the ports of a pair of oil chambers of an actuator and whether the operation is normal is determined based on the results of pressure measurement performed by the pressure sensors during operation of the actuator. However, to perform such a test, pressure sensors that are installed respectively corresponding to the ports of the pair of oil chambers of the actuator and that are used only for the test are required, leading to an increase in the number of sensors. Also, signal wiring and a processing unit are required for determining whether the operation is normal by acquiring and processing signals from the test pressure sensors. This increases the complexity of the test mechanism and also leads to increased costs. Furthermore, it is necessary to take into consideration the influences of variations that result from determining whether the operation is normal based on the results of measurements performed by the pressure sensors, including, for example, the influence of variations caused by different pressure measurement conditions and the influence of variations caused by measurement errors. This also poses the problem that it is difficult to obtain a highly reliably test result.

In view of the foregoing circumstances, it is an object of the present invention to provide an aircraft actuator control apparatus with which it is possible to suppress an increase in the number of sensors and an increase in complexity of the mechanism for testing the operation of a control system that controls actuators, and also to increase the reliability of the test result.

According to a first feature of an aircraft actuator control apparatus of the present invention for achieving the above-described object, there is provided an aircraft actuator control apparatus including: a plurality of hydraulically operated actuators that drive a control surface of an aircraft; and a plurality of control systems that respectively control operation of the plurality of actuators, wherein each of the plurality of control systems includes: a control valve that controls operation of the corresponding actuator by switching a path of pressure oil that is supplied to and discharged from each of a pair of oil chambers of the actuator; a state switching valve that is installed between the control valve and the actuator so as to provide communication between the control valve and the actuator, that includes an orifice that can be in communication with the pair of oil chambers, and that switches an operating state of the actuator; and a test orifice circuit that includes a test orifice used for testing a performance of the orifice and that can be in communication with the actuator via the state switching valve, the state switching valve is provided such that its position can be switched between: an actuator connection position to connect the actuator to the control valve so as to allow the pressure oil to flow between each of the pair of oil chambers and the control valve; a damping position to allow the pressure oil discharged from each of the pair of oil chambers to pass through the orifice; and a test orifice position to provide communication between each of the pair of oil chambers and the test orifice circuit so as to allow the pressure oil discharged from each of the pair of oil chambers to pass through the test orifice, in a state where the control surface is driven by at least one of the plurality of actuators, a performance test for the orifice can be executed in the control system under test that corresponds to another one of the actuators that is different from the actuator that drives the control surface, and the performance test for the orifice can be executed by comparing, for the control system under test and the actuator corresponding thereto, an operating speed of the actuator when the state switching valve is switched to the damping position with an operating speed of the actuator when the state switching valve is switched to the test orifice position.

With this configuration, the state switching valves that switch the operating state of the actuators are configured such that their positions can be switched between the actuator connection position, the damping position, and the test orifice position to provide communication between each of the actuators and the test orifice circuit including the test orifice. Then, a performance test for the orifice is executed by comparing the operating speed of the actuator when the state switching valve is switched to the damping position with the operating speed of the actuator when the state switching valve is switched to the test orifice position. Accordingly, it is not necessary to install test pressure sensors respectively corresponding to the ports of the pairs of oil chambers of the actuators, and therefore it is possible to suppress an increase in the number of sensors. Also, signal wiring and a processing unit for determining whether the operation is normal by acquiring and processing signals from test pressure sensors will not be required in the first place, making it possible to suppress an increase in complexity of the mechanism for testing the operation of the control systems of the actuators. This can lead to reduced costs. Furthermore, the test orifice serving as the reference for determining the normal operation can be directly used to determine whether the operation is normal, and therefore it is possible to obtain a highly reliably test result.

Therefore, with this configuration, it is possible to provide an aircraft actuator control apparatus with which it is possible to suppress an increase in the number of sensors and an increase in complexity of the mechanism for testing the operation of the control systems that control the actuators, and also increase the reliability of test results.

According to a second feature of the aircraft actuator control apparatus of the present invention, in the aircraft actuator control apparatus having the first feature, when switched to the damping position, the state switching valve connects the pair of oil chambers to each other so as to provide communication between the pair of oil chambers via the orifice, or connects the pair of oil chambers to an oil discharge system in the control valve via the orifice.

With this configuration, in a state where the state the switching valves are switched to the damping position, each of the pairs of oil chambers are connected to each other via the orifice or connected to the oil discharge system. Accordingly, the damping function of causing the actuators to follow an external force exerted on the control surface is fulfilled efficiently. Accordingly, it is possible to achieve an aircraft actuator control apparatus with which it is possible to increase the reliability of a performance test for the orifice in the state switching valve that can efficiently fulfill the damping function, thus suppressing an increase in the number of sensors and an increase in complexity of the test mechanism.

According to a third feature of the aircraft actuator control apparatus of the present invention, in the aircraft actuator control apparatus having the first feature, the state switching valve is provided with a control lever for switching between positions by manual operation, and an operation of switching to the test orifice position can be performed by manual operation of the control lever.

With this configuration, the operation for switching to the test orifice position is performed by manual operation using the control lever. Accordingly, a performance test for the orifice can be easily and reliably executed by manual operation.

According to a fourth feature of the aircraft actuator control apparatus of the present invention, in the aircraft actuator control apparatus having the first feature, the state switching valve is provided such that its position can also be switched to a complete interruption position where control valve ports in communication with the control valve, actuator ports in communication with the pair of oil chambers of the actuator, and test ports in communication with the test orifice circuit are all interrupted, in a state where the pressure oil is supplied to one of the plurality of actuators, a performance test for a hydraulic circuit connecting to the state switching valve and to another one of the actuators that is different from the actuator to which the pressure oil is supplied is executed in the control system under test that corresponds to that other one of the actuators, and the performance test for the hydraulic circuit can be executed by determining whether the control surface is stopped.

With this configuration, the state switching valves are configured such that their positions can be switched to the complete interruption position to interrupt all ports, in addition to the actuator connection position, the damping position and the test orifice position. Then, a performance test for the hydraulic circuit connecting to the state switching valve and the actuator is executed by determining whether the control surface is stopped when the state switching valve is switched to the complete interruption position. Accordingly, in addition to a performance test for the orifice, a performance test for the hydraulic circuit connecting to the state switching valve and the actuator can also be executed by a simple configuration achieved by providing the state switching valves with the complete interruption position. This makes it possible to determine whether the operation is normal separately for each of the orifice and the hydraulic circuit that connects to the state switching valve and the actuator, thus obtaining an even more reliable test result.

According to a fifth feature of an aircraft actuator control apparatus of the present invention for achieving the above-described object, there is provided an aircraft actuator control apparatus including: a plurality of hydraulically operated actuators that drive a control surface of an aircraft; and a plurality of control systems that respectively control operation of the plurality of actuators, wherein each of the plurality of control systems includes: a control valve that controls operation of the corresponding actuator by switching a path of pressure oil that is supplied to and discharged from each of a pair of oil chambers of the actuator; and a state switching valve that is installed between the control valve and the actuator so as to provide communication between the control valve and the actuator, that includes an orifice that can be in communication with the pair of oil chambers, and that switches an operating state of the actuator; the state switching valve is provided such that its position can be switched between: an actuator connection position to connect the actuator to the control valve so as to allow the pressure oil to flow between each of the pair of oil chambers and the control valve; a damping position to allow the pressure oil discharged from each of the pair of oil chambers to pass through the orifice; and a complete interruption position where control valve ports in communication with the control valve and actuator ports in communication with the pair of oil chambers of the actuator are all interrupted, by supply of the pressure oil to at least one of the plurality of actuators, a performance test for a hydraulic circuit connecting to the state switching valve and to another one of the actuators that is different from the actuator that drives the control surface can be executed in the control system under test that corresponds to that other one of the actuators, and the performance test for the hydraulic circuit can be executed by determining whether the control surface is stopped.

With this configuration, the state switching valves that switch the operating state of the actuators is configured such that their position can be switched between the actuator connection position, the damping position, and the complete interruption position that interrupts all of ports. Then, a performance test for the hydraulic circuit connecting to the state switching valve and the actuator is executed by determining whether the control surface is stopped when the state switching valve is switched to the complete interruption position. Accordingly, a performance test for the hydraulic circuit connecting to the state switching valve and the actuator can be executed by a simple configuration achieved by providing the state switching valve with the complete interruption position. Accordingly, it is not necessary to install test pressure sensors respectively corresponding to the ports of the pairs of oil chambers of the actuators, and therefore it is possible to suppress an increase in the number of sensors. Also, signal wiring and a processing unit for determining whether the operation is normal by acquiring and processing signals from test pressure sensors will not be required in the first place, making it possible to suppress an increase in complexity of the mechanism for testing the operation of the control systems of the actuators. This can lead to reduced costs. Furthermore, whether the operation of the hydraulic circuit connecting to the state switching valve and the actuator is normal can be directly determined by forcefully interrupting all ports, and therefore it is possible to obtain a highly reliably test result.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. It should be appreciated that this embodiment can be widely applied to an aircraft actuator control apparatus including a plurality of hydraulically operated actuators that drive a control surface of an aircraft and a plurality of control systems that respectively control the operation of the plurality of actuators.

Figure 1:
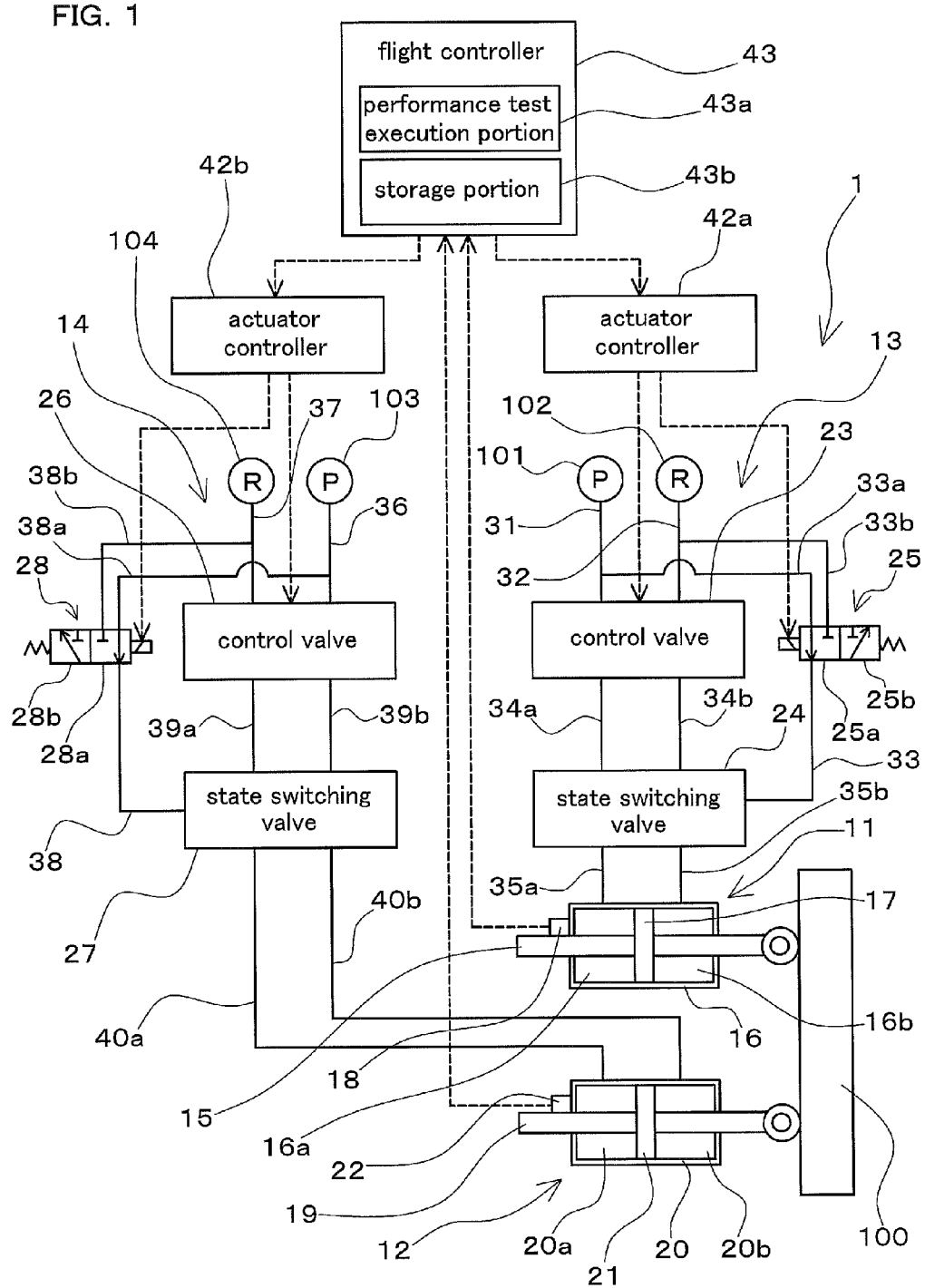
FIG. 1 is a hydraulic circuit diagram schematically showing an aircraft actuator control apparatus according to an embodiment of the present invention.

FIG. 1 is a hydraulic circuit diagram schematically showing an aircraft actuator control apparatus 1 according to one embodiment of the present invention. The aircraft actuator control apparatus 1 (hereinafter, also simply referred to as a "control apparatus 1") includes a plurality of (in this embodiment, two) hydraulically operated actuators (11, 12) that drive a control surface 100 of an aircraft (not shown) and a plurality of control systems (13, 14) that respectively control the operation of the plurality of actuators (11, 12). Note that the control surface 100 is a moving surface (flight control surface) of the aircraft, and may be configured, for example, as an aileron provided in the main wing, an elevator provided in the tailplane, a rudder provided in the vertical tail, or the like.

The control apparatus 1 is provided with a first actuator 11 and a second actuator 12 as the actuators (11, 12). Each of the first and second actuators (11, 12) is coupled to the control surface 100 and configured as a cylinder mechanism that can independently drive the control surface 100.

The first actuator 11 is provided with a rod 15, a cylinder 16 through which the rod 15 penetrates so as to be axially movable, and a piston 17 that is fixed to the rod 15. The interior of the cylinder 16 is divided into a pair of oil chambers (16a, 16b) by the piston 17. The first actuator 11 is also provided with a position sensor 18 for detecting the position of the rod 15 with respect to the cylinder 16. The second actuator 12 is provided with a rod 19, and a cylinder 20 through which the rod 19 penetrates so as to be axially movable, and a piston 21 that is fixed to the rod 19. The interior of the cylinder 20 is divided into a pair of oil chambers (20a, 20b) by the piston 21. The second actuator 12 is also provided with a position sensor 22 for detecting the position of the rod 19 with respect to the cylinder 20.

Further, the control apparatus 1 is provided with a first control system 13 and a second control system 14 as the control systems (13, 14). The first control system 13 is configured to provide communication between the pair of oil chambers (16a, 16b) of the first actuator 11 and each of a first system hydraulic power source 101 and a reservoir circuit 102. On the other hand, the second control system 14 is configured to provide communication between the pair of oil chambers (20*a*, 20*b*) of the second actuator 12 and each of a second system hydraulic power source 103 and a reservoir circuit 104.

Each of the first system hydraulic power source 101 and the second system hydraulic power source 103 is provided with a hydraulic pump that supplies pressure oil (working fluid), and is installed on the body side of the aircraft (not shown). Also, the first system hydraulic power source 101 and the second system hydraulic power source 103 are provided as systems that are independent of each other. Note that in the aircraft in which the above-described hydraulic power sources (101, 103) are installed, the first and second actuators (11, 12) that drive the control surface 100 and actuators (not shown) that drive control surfaces (not shown) other than the control surface 100 are operated by supply of pressure oil from each of the first system hydraulic power source 101 and the second system hydraulic power source 103.

The reservoir circuit 102 includes a tank (not shown) into which pressure oil that is supplied as pressure oil from the first system hydraulic power source 101 and is thereafter discharged from the first actuator 11 flows back, and the reservoir circuit 102 is configured to be in communication with the first system hydraulic power source 101. The reservoir circuit 104 that is configured as a system independent of the reservoir circuit 102 includes a tank (not shown) into which pressure oil that is supplied as pressure oil from the second system hydraulic power source 103 and is thereafter discharged from the second actuator 12 flows back, and the reservoir circuit 104 is configured to be in communication with the second system hydraulic power source 103. With this configuration, the pressure of the oil that has returned to the reservoir circuit 102 is raised by the first system hydraulic power source 101, and the oil is supplied to the first actuator 11 via the first control system 13. On the other hand, the pressure of the oil that has returned to the reservoir circuit 104 is raised by the second system hydraulic power source 103, and the oil is supplied to the second actuator 12 via the second control system 14.

Figure 2:
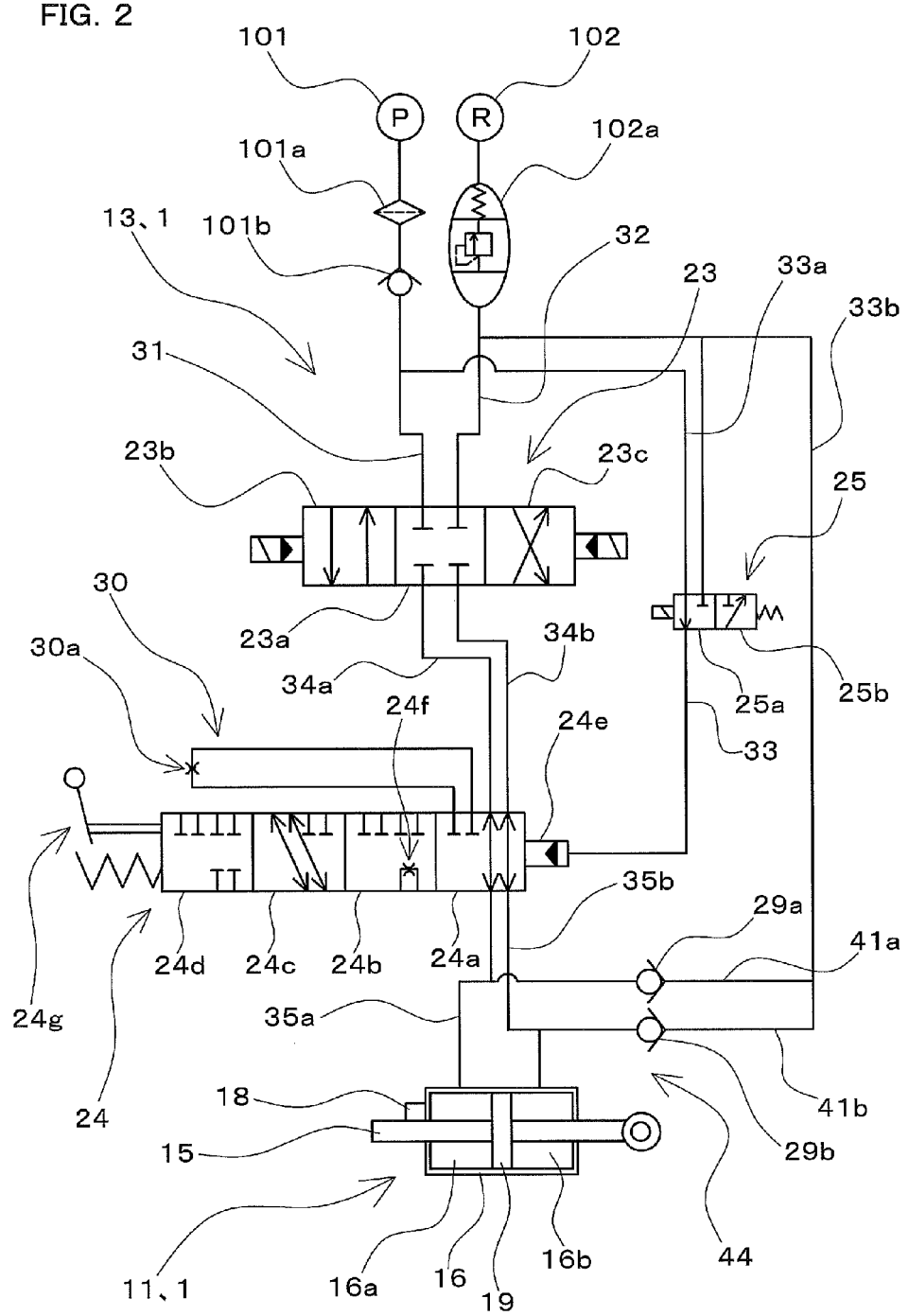
FIG. 2 is a hydraulic circuit diagram showing the details of part of the aircraft actuator control apparatus shown in FIG. 1.

FIG. 2 is a hydraulic circuit diagram illustrating the details of part of the control apparatus 1, showing the first control system 13 and the first actuator 11. The first control system 13 shown in FIGS. 1 and 2 includes a control valve 23, a state switching valve 24, a solenoid valve 25, check valves (29*a*, 29*b*), a test orifice circuit 30, a supply oil passage 31, a discharge oil passage 32, a pilot pressure oil passage 33, supply/discharge oil passages (34*a*, 34*b*, 35*a*, 35*b*), and so forth. The second control system 14 shown in FIG. 1 includes a control valve 26, a state switching valve 27, a solenoid valve 28, check valves (not shown) configured in the same manner as the check valves (29*a*, 29*b*), a test orifice circuit (not shown) configured in the same manner as the test orifice circuit 30, a supply oil passage 36, a discharge oil passage 37, a pilot pressure oil passage 38, supply/discharge oil passages (39*a*, 39*b*, 40*a*, 40*b*), and so forth.

The supply oil passage 31 of the first control system 13 is an oil passage that connects the first system hydraulic power source 101 to the control valve 23 to supply the pressure oil from the first system hydraulic power source 101. Also, the supply oil passage 31 is provided with a filter 101*a* for removing foreign matter contained in the oil and a check valve 101*b* that permits flow of pressure oil from the first system hydraulic power source 101 and prevents flow of the oil in a direction flowing back to the first system hydraulic power source 101. The discharge oil passage 32 of the first control system 13 is an oil passage that connects the control valve 23 to the reservoir circuit 102 to discharge the oil discharged from the control valve 23 to the reservoir circuit 102. Also, the discharge oil passage 32 is provided with an accumulator 102*a* including a relief valve. By provision of the accumulator 102*a* in the discharge oil passage 32, the pressure of the pressure oil in the circuit of the first control system 13 and the first actuator 11 on the upstream side of the accumulator 102*a* (the side opposite to the side in communication with the reservoir circuit 102) is maintained at a pressure equal to or greater than a relief pressure generated by the relief valve of the accumulator 102*a*.

The supply oil passage 36 of the second control system 14 is an oil passage that connects the second system hydraulic power source 103 to the control valve 26 to supply the pressure oil from the second system hydraulic power source 103. The supply oil passage 36 is provided with a filter and a check valve (not shown) that are configured in the same manner as the filter 101*a* and the check valve 101*b* of the first control system 13. The discharge oil passage 37 of the second control system 14 is an oil passage that connects the control valve 26 to the reservoir circuit 104 to discharge the oil discharged from the control valve 26 to the reservoir circuit 104. The discharge oil passage 37 is provided with an accumulator (not shown) configured in the same manner as the accumulator 102*a* of the first control system 13.

The supply/discharge oil passages (34*a*, 34*b*) of the first control system 13 are provided as oil passages that connect the control valve 23 to the state switching valve 24 and through which the pressure oil discharged from the first system hydraulic power source 101 and the pressure oil discharged to the reservoir circuit 102 flow. The supply/discharge oil passages (35*a*, 35*b*) of the first control system 13 are provided as oil passages that connect the state switching valve 24 to the first actuator 11 and through which the pressure oil supplied to the first actuator 11 and the pressure oil discharged from the first actuator 11 flow. Note that the supply/discharge oil passage 35*a* is configured to connect to the oil chamber 16*a*, which is one of the pair of oil chambers (16*a*, 16*b*) of the first actuator 11, whereas the supply/discharge oil passage 35*b* is configured to connect to the other oil chamber 16*b*.

The supply/discharge oil passages (39*a*, 39*b*) of the second control system 14 are provided as oil passages that connect the control valve 26 to the state switching valve 27 and through which the pressure oil discharged from the second system hydraulic power source 103 and the pressure oil discharged to the reservoir circuit 104 flow. The supply/discharge oil passages (40*a*, 40*b*) of the second control system 14 are provided as oil passages that connect the state switching valve 27 to the second actuator 12 and through which the pressure oil supplied to the second actuator 12 and the pressure oil discharged from the second actuator 12 flow. Note that the supply/discharge oil passage 40*a* is configured to connect to the oil chamber 20*a*, which is one of the pair of oil chambers (20*a*, 20*b*) of the second actuator 12, whereas the supply/discharge oil passage 40*b* is configured to connect to the other oil chamber 20*b*.

The pilot pressure oil passage 33 of the first control system 13 is an oil passage that connects the pilot pressure chamber 24*e* of the state switching valve 24 to the solenoid valve 25 to supply and discharge pilot pressure oil for operating the state switching valve 24. The solenoid valve 25 connects to the supply oil passage 31 via the oil passage 33*a* and connects to the discharge oil passage 32 via the oil passage 33*b*. As shown in FIGS. 1 and 2, in the magnetized state, for example, the solenoid valve 25 is switched to a supply position 25*a* in which it connects the oil passage 33*a* to the pilot pressure oil passage 33 and allows the pilot pressure oil from the first system hydraulic power source 101 to be supplied to the pilot pressure chamber 24e of the state switching valve 24. On the other hand, in the demagnetized state, for example, the solenoid valve 25 is switched to a discharge position 25b in which it interrupts the oil passage 33a and connects the pilot pressure oil passage 33 to the oil passage 33b. Accordingly, the pilot pressure oil supplied to the pilot pressure chamber 24e can be discharged to the reservoir circuit 102.

The pilot pressure oil passage 38 of the second control system 14 is an oil passage that connects the pilot pressure chamber (not shown) of the state switching valve 27 to the solenoid valve 28 to supply and discharge pilot pressure oil for operating the state switching valve 27. The solenoid valve 28 connects to the supply oil passage 36 via the oil passage 38a and connects to the discharge oil passage 37 via the oil passage 38b. As shown in FIG. 1, in the magnetized state, for example, the solenoid valve 28 is switched to a supply position 28a in which it connects the oil passage 38a to the pilot pressure oil passage 38 and allows the pilot pressure oil from the second system hydraulic power source 103 to be supplied to the pilot pressure chamber of the state switching valve 27. On the other hand, in the demagnetized state, for example, the solenoid valve 28 is switched to a discharge position 28b in which it interrupts the oil passage 38a and connects the pilot pressure oil passage 38 to the oil passage 38b. Accordingly, the pilot pressure oil supplied to the pilot pressure chamber of the state switching valve 27 can be discharged to the reservoir circuit 104.

The check valve 29a of the first control system 13 is installed in an oil passage 41a connecting the supply/discharge oil passage 35a to the oil passage 33b, and is provided so as to permit flow of the pressure oil from the side of the oil passage 41a connecting to the oil passage 33b to the side thereof connecting to the oil passage 35a and prevent flow of the pressure oil in the opposite direction. This provides a configuration in which the pressure oil having a pressure greater than or equal to a predetermined relief pressure maintained by the accumulator 102a can be introduced to one of the oil chambers, namely, the oil chamber 16a to which the oil passage 35a is connected, in the case where there is a reduction in pressure of the pressure oil in the oil chamber 16a. The check valve 29b is installed in an oil passage 41b connecting the supply/discharge oil passage 35b to the oil passage 33b, and is provided so as to permit flow of the pressure oil from the side of the oil passage 41b connecting to the oil passage 33b to the side thereof connecting to the oil passage 35b and prevent flow of the pressure oil in the opposite direction. This provides a configuration in which the pressure oil having a pressure greater than or equal to a predetermined relief pressure maintained by the accumulator 102a can be introduced to the other oil chamber 16b to which the oil passage 35b is connected, in the case where there is a reduction in pressure of the pressure oil in the oil chamber 16b. Although not shown, the second control system 14 is also provided with two check valves configured in the same manner as the check valves (29a, 29b) of the first control system 13.

The control valve 23 of the first control system 13 is an electrohydraulic servo valve that controls the operation of the first actuator 11 by switching between the paths of the pressure oil that is supplied to and discharged from the pair of oil chambers (16a, 16b) of the first actuator 11. The control valve 23 is driven in accordance with a command signal from an actuator controller 42a that controls the operation of the first actuator 11. The actuator controller 42a controls the first actuator 11 in accordance with a command signal from a flight controller 43 serving as a further superordinate computer that commands the operation of the control surface 100.

Note that the flight controller 43 may include, for example, a central processing unit (CPU), a memory, an interface, and so forth, which are not shown.

The control valve 26 of the second control system 14 is an electrohydraulic servo valve that controls the operation of the second actuator 12 by switching between the paths of the pressure oil that is supplied to and discharged from the pair of oil chambers (20a, 20b) of the second actuator 12. The control valve 26 is driven in accordance with a command signal from an actuator controller 42b that controls the operation of the second actuator 12. The actuator controller 42b controls the second actuator 12 in accordance with a command signal from the flight controller 43.

The flight controller 43 is configured to receive input of a position detection signal for the rod 15 that is detected by the position sensor 18 of the first actuator 11 and a position detection signal for the rod 19 that is detected by the position sensor 22 of the second actuator 12. The flight controller 43 controls the supply and discharge of pressure oil to and from the pair of oil chambers (16a, 16b) via the actuator controller 42a and the control valve 23 so as to provide a feedback control of the position of the rod 15 in accordance with the above-described position detection signal, thereby controlling the operation of the control surface 100. Likewise, the flight controller 43 controls the supply and discharge of pressure oil to and from the pair of oil chambers (20a, 20b) via the actuator controller 42b and the control valve 26 so as to provide a feedback control of the position of the rod 19 in accordance with the above-described position detection signal, thereby controlling the operation of the control surface 100.

As shown in FIG. 2, the control valve 23 of the first control system 13 is provided such that its position can be proportionally switched between a neutral position 23a, a first switching position 23b, and a second switching position 23c. When switched to the neutral position 23a, the control valve 23 interrupts the supply oil passage 31 and the discharge oil passage 32 from the supply/discharge oil passage (34a, 34b), thus maintaining a state where the supply and discharge to and from the pair of oil chambers (16a, 16b) are stopped and the rod 15 of the first actuator 11 is stopped.

When the control valve 23 is switched from the neutral position 23a to the first switching position 23b, the supply oil passage 31 is connected to the supply/discharge oil passage 34a to supply the pressure oil to supplied to one of the actuators, namely, the oil chamber 16a, and the discharge oil passage 32 is connected to the supply/discharge oil passage 34b to discharge the pressure oil from the other oil chamber 16b. On the other hand, when the control valve 23 is switched from the neutral position 23a to the second switching position 23c, the supply oil passage 31 is connected to the supply/discharge oil passage 34b to supply pressure oil to the oil chamber 16b, and the discharge oil passage 32 is connected to the supply/discharge oil passage 34a to discharge the pressure oil from the oil chamber 16a. Note that in a state where the control valve 23 is switched to the first switching position 23b and a state where the control valve 23 is switched to the second switching position 23c, the rod 15 moves in opposite directions and thus the control surface 100 is also driven so as to operate in opposite directions. The control valve 26 of the second control system 14 is configured and operated in the same manner as the control valve 23 of the first control system 13, and therefore the description thereof is omitted.

The state switching valve 24 of the first control system 13 is installed between the control valve 23 and the first actuator 11 so as to provide communication between the control valve 23 and the first actuator 11. The state switching valve 24 includes an orifice 24f that can be in communication with the pair of oil chambers (16a, 16b) of the first actuator 11, and is configured as a valve that switches the operating state of the first actuator 11. The state switching valve 27 of the second control system 14 is installed between the control valve 26 and the second actuator 12 so as to provide communication between the control valve 26 and the second actuator 12. The state switching valve 27 includes an orifice (not shown) that can be in communication with the pair of oil chambers (20a, 20b) of the second actuator 12, and is configured as a valve that switches the operating state of the second actuator 12.

The test orifice circuit 30 of the first control system 13 includes a test orifice 30a used for testing the performance of the orifice 24f of the state switching valve 24, and is provided as a hydraulic circuit that can be in communication with the first actuator 11 via the state switching valve 24. The test orifice circuit 30 is configured as a single oil passage whose exits on both ends respectively connect to test ports (24j, 24j), which will be described below, of the state switching valve 24, and the test orifice 30a is provided in the middle of this oil passage. The test orifice circuit 30 may be configured as a hydraulic circuit provided in a casing integrated with the state switching valve 24, or may be configured as a hydraulic circuit provided in a casing separate from the state switching valve 24.

The test orifice 30a is configured as a portion of the oil passage containing the test orifice circuit 30 and being in communication with the test ports (24j, 24j) of the state switching valve 24, and that portion has a reduced cross sectional area so as to reduce the flow rate of the pressure oil flowing through the oil passage. Also, the test orifice 30a is configured as an orifice having the same specifications as the orifice 24f of the state switching valve 24. In other words, the orifice 24f and the test orifice 30a have the same performance in their unused state immediately after installation. As the performance of the orifice 24f is degraded through use, there will be a difference in performance between the orifice 24f and the test orifice 30a. For this reason, the control apparatus 1 is configured to detect the degree of degradation of the orifice 24f through testing of the performance of the orifice 24f that can be compared with the performance of the test orifice 30a as the reference.

The test orifice circuit (not shown) of the second control system 14 includes a test orifice (not shown) used for a performance test for an orifice (not shown) of the state switching valve 27, and is provided as a hydraulic circuit that can be in communication with the second actuator 12 via the state switching valve 27. The test orifice of the test orifice circuit of the second control system 14 is configured as an orifice having the same specification as the orifice of the state switching valve 27. Note that the test orifice circuit of the second control system 14 is configured in the same manner as the test orifice circuit 30 of the first control system 13, and therefore the detailed description thereof is omitted.

The state switching valve 24 of the first control system 13 will now be described in further details. Note that the state switching valve 27 of the second control system 14 is configured in the same manner as the state switching valve 24 of the first control system 13, and therefore the further detailed description of the state switching valve 27 is omitted.

Figure 3A:
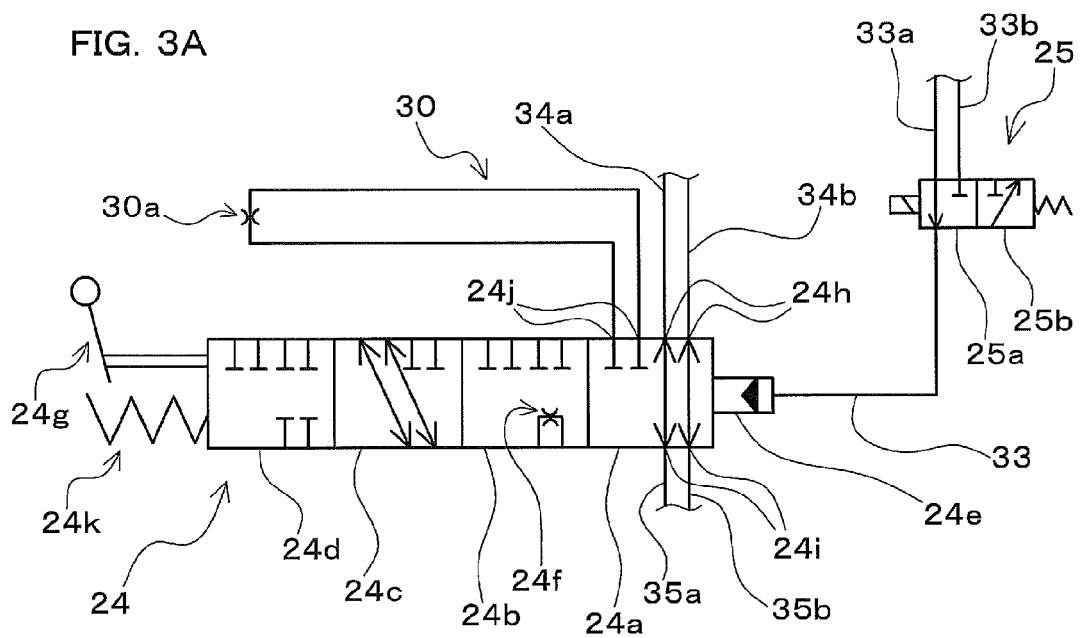
FIG. 3A is a hydraulic circuit diagram illustrating an operation of a state switching valve of the aircraft actuator control apparatus shown in FIG. 2.
Figure 3B:
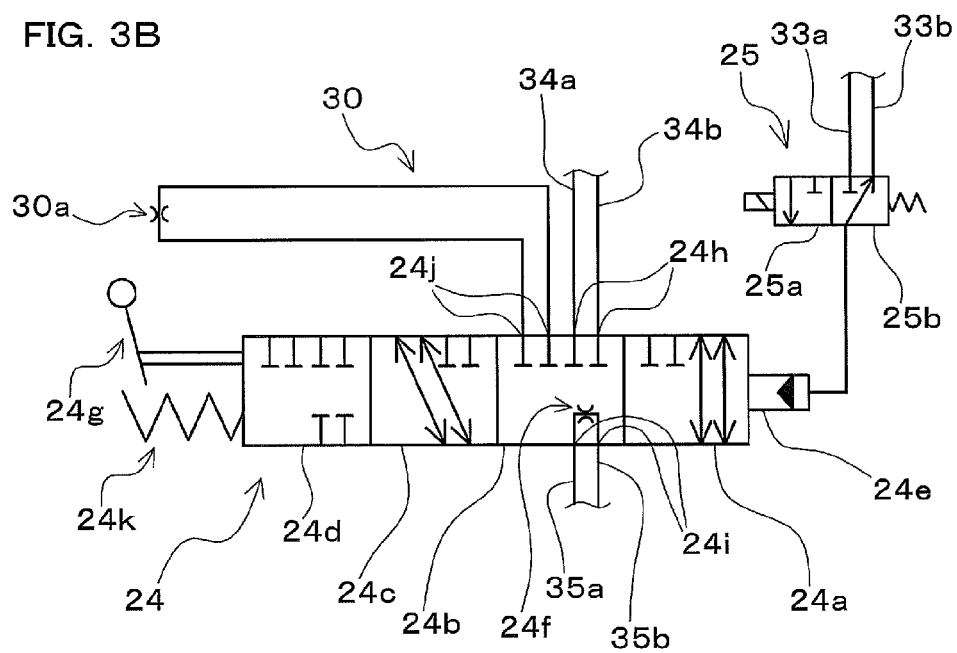
FIG. 3B is a hydraulic circuit diagram illustrating an operation of the state switching valve of the aircraft actuator control apparatus shown in FIG. 2.
Figure 4A:
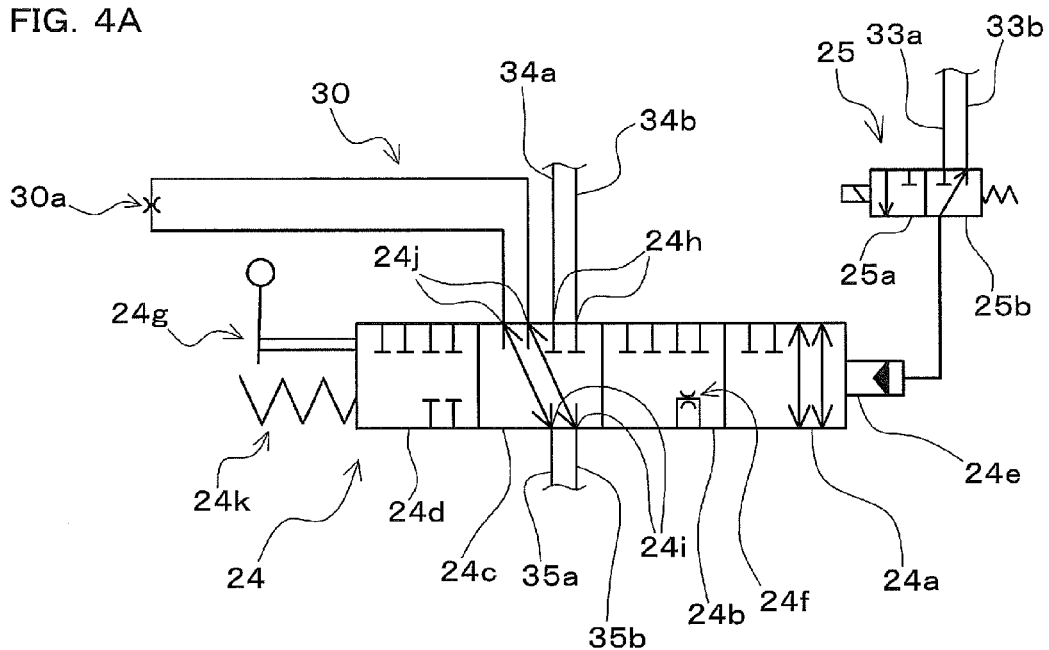
FIG. 4A is a hydraulic circuit diagram illustrating an operation of the state switching valve of the aircraft actuator control apparatus shown in FIG. 2.
Figure 4B:
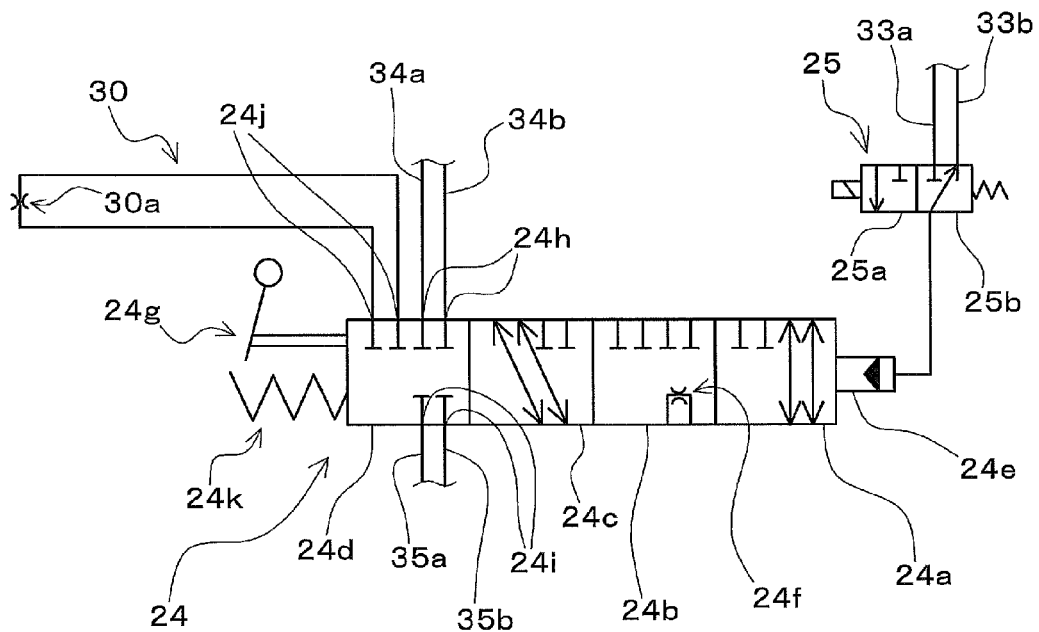
FIG. 4B is a hydraulic circuit diagram illustrating an operation of the state switching valve of the aircraft actuator control apparatus shown in FIG. 2.

As shown in FIG. 2, the state switching valve 24 is provided such that its position can be switched between an actuator connection position 24a, a damping position 24b, a test orifice position 24c and a complete interruption position 24d. FIGS. 3 (FIGS. 3A, 3B) and FIGS. 4 (FIGS. 4A, 4B) are hydraulic circuit diagrams illustrating the operation of the state switching valve 24, each showing the state switching valve 24 and a hydraulic circuit located in the vicinity of the state switching valve 24 in FIG. 2. Note that FIG. 3A shows a state where the state switching valve 24 is switched to the actuator connection position 24a, FIG. 3B shows a state where the state switching valve 24 is switched to the damping position 24b, FIG. 4A shows a state where the state switching valve 24 is switched to the test orifice position 24c, and FIG. 4B shows a state where the state switching valve 24 is switched to the complete interruption position 24d.

Furthermore, as shown in FIGS. 2 to 4, the state switching valve 24 is provided with the pilot pressure chamber 24e, the orifice 24f, a control lever 24g, control valve ports (24h, 24h), actuator ports (24i, 24i), the test ports (24j, 24j), and so forth. Note that the state switching valve 24 is configured to be switched between the connected state and the interrupted state of the oil passages between the ports (24h, 24h, 24i, 24i, 24j, 24j) by changing the position of the spool (not shown) in its sleeve (not shown). Also, the state switching valve 24 is configured such that its position is switched between the actuator connection position 24a, the damping position 24b, the test orifice position 24c, and the complete interruption position 24d in this order by sequentially changing the position of its spool from the end where the control lever 24g is provided toward the end where the pilot pressure chamber 24e is provided.

The pilot pressure chamber 24e is an oil chamber to which pilot pressure oil is introduced via the solenoid valve 25 and the pilot pressure oil passage 33. In a state where pressure oil has been supplied to the pilot pressure chamber 24e, the state switching valve 24 is switched to the actuator connection position 24a by a biasing force exerted by the pilot pressure oil against the spring force of a spring 24k (see FIG. 3A). On the other hand, the state switching valve 24 is switched to the damping position 24b by the spring force of the spring 24k as a result of the pilot pressure oil being discharged from the pilot pressure chamber 24e (see FIG. 3B).

The orifice 24f is disposed in an oil passage that constitutes the damping position 24b of the state switching valve 24 and that can provide communication between the supply/discharge oil passage 35a and the supply/discharge oil passage 35b. Also, the orifice 24f is provided, for example, in the oil passage that can provide communication between the supply/discharge oil passages (35a, 35b) as a notch configured as a portion having a reduced cross sectional area so as to reduce the flow rate of the pressure oil flowing from one of the supply/discharge oil passages (35a, 35b) to the other.

The control lever 24g is a mechanism with which the operator (not shown) switches the position of the state switching valve 24 by manual operation. The operation of switching the position of the state switching valve 24 with the control lever 24g is performed in a state where the solenoid valve 25 is switched to the discharge position 25b to discharge the pilot pressure oil from the pilot pressure chamber 24e and the state switching valve 24 is thereby switched to the damping position 24b (the state shown in FIG. 3B).

Further, the control lever 24g is configured to switch the position of the state switching valve 24 in two steps. In the first switching operation performed with the control lever 24g, the state switching valve 24 is switched from the damping position 24b to the test orifice position 24c (see FIG. 4A). Then, in the second switching operation performed with the control lever 24g, the state switching valve 24 is switched from the test orifice position 24c to the complete interruption position 24d (see FIG. 4B). Thus, the state switching valve 24 is configured to perform the operation of switching to each of the test orifice position 24c and the complete interruption position 24d through manual operation of the control lever 24g.

Note that the state switching valve 24 is switched to the test orifice position 24c, for example, by manually urging the control lever 24g toward the pilot pressure chamber 24e in the damping position 24b to move the spool position, causing the spool to stop against the sleeve or the like. Also, the state switching valve 24 is switched to the complete interruption position 24d, for example, by manually rotating the control lever 24g in the direction of rotation about the spool axis in the test orifice position 24c and then further manually urging the control lever 24f toward the pilot pressure chamber 24e to further move the spool position, causing the spool to stop against the sleeve or the like.

The control valve ports (24h, 24h) are provided as ports that are in communication with the control valve 23, with one of the control valve ports (24h, 24h) being configured to connect to the supply/discharge oil passage 34a and the other being configured to connect to the supply/discharge oil passage 34b. The actuator ports (24i, 24i) are provided as ports that are in communication with the pair of oil chambers (16a, 16b) of the first actuator 11, with one of the actuator ports (24i, 24i) being configured to connect to the supply/discharge oil passage 35a and the other being configured to connect to the supply/discharge oil passage 35b. The test ports (24j, 24j) are provided as ports that are in communication with the test orifice circuit 30, with each of the ports (24j, 24j) being configured to connect to exits on both ends of the test orifice circuit 30.

The actuator connection position 24a is configured as a position to connect the first actuator 11 to the control valve 23 such that pressure oil flows between each of the pair of oil chambers (16a, 16b) of the first actuator 11 and the control valve 23. That is, as shown in FIG. 3A, in a state where the state switching valve 24 is switched to the actuator connection position 24a, the control valve ports (24h) respectively connected to the supply/discharge oil passages (34a, 34b) are in communication with the actuator ports (24i) respectively connected to the supply/discharge oil passages (35a, 35b).

In a state where the state switching valve 24 is switched to the actuator connection position 24a, the control valve 23 operates in accordance with a command signal from the flight controller 43 via the actuator controller 42a. Consequently, the supply/discharge of pressure oil to/from the pair of oil chambers (16a, 16b) of the first actuator 11 is controlled, and thereby the operation of the first actuator 11 is controlled.

The damping position 24b is configured as a position to allow the pressure oil discharged from each of the pair of oil chambers (16a, 16b) of the first actuator 11 to pass through the orifice 24f and to provide communication between the pair of oil chambers (16a, 16b). That is, as shown in FIG. 3B, when switched to the damping position 24b, the state switching valve 24 connects the pair of oil chambers (16a, 16b) to each other so as to provide communication between the pair of oil chambers (16a, 16b) via the orifice 24f. Note that in a state where the state switching valve 24 is switched to the damping position 24b, the actuator ports (24i, 24i) respectively connected to the supply/discharge oil passages (35a, 35b) are in communication with each other via the orifice 24f.

For example, when a loss or degradation in the function of the first system hydraulic power source 101 occurs, the actuator controller 42a demagnetizes the solenoid valve 25 in accordance with a command signal from the flight controller 43. Consequently, the solenoid valve 25 is switched to the discharge position 25b to discharge the pilot pressure oil from the pilot pressure chamber 24e, and the state switching valve 24 is switched to the damping position 24b by the spring force of the spring 24k.

When the state switching valve 24 is switched to the damping position 24b, the first actuator 11 operates so as to follow an external force exerted on the control surface 100 driven by the second actuator 12 (e.g., the driving force exerted by the second actuator 12). With the movement of the rod 15 during this operation, the pressure oil flows between the pair of oil chambers (16a, 16b) through the orifice 24f, and the damping function by the orifice 24f is thus fulfilled. This prevents the first actuator 11 from operating to impede the operation of the second actuator 12 for which a loss or the like in the function of the second system hydraulic power source 103 has not occurred in the control apparatus 1.

When a loss or the like in the function occurs in both of the first system hydraulic power source 101 and the second system hydraulic power source 103, the state switching valve 24 of the first control system 13 and the state switching valve 27 of the second control system 14 are both switched to the damping position. In this case, the first actuator 11 and the second actuator 12 operate so as to follow an external force exerted on the control surface 100 (e.g., wind force exerted on the aircraft wing during flight). With the movement of the rods (15, 19) during this operation, the pressure oil flows between the pair of oil chambers (16a, 16b) and between the pair of oil chambers (20a, 20b) through the orifices, and thereby the damping function by the orifices is fulfilled. This can prevent an abnormal operation of the control surface 100, including, for example, excessive movement of the control surface 100 such as flutter.

The test orifice position 24c is configured as a position to provide communication between each of the pair of oil chambers (16a, 16b) and the test orifice circuit 30 so as to allow the pressure oil discharged from each of the pair of oil chambers (16a, 16b) of the first actuator 11 to pass through the test orifice 30a. That is, as shown in FIG. 4A, when switched to the test orifice position 24c, the state switching valve 24 connects the pair of oil chambers (16a, 16b) so as to provide communication between the pair of oil chambers (16a, 16b) via the test orifice 30a. Accordingly, in a state where the state switching valve 24 is switched to the test orifice position 24c, the actuator ports (24i, 24i) respectively connected to the supply/discharge oil passage (35a, 35b) are in communication with the test ports (24j, 24j) respectively connected to the test orifice circuit 30. Note that the switching of the position of the state switching valve 24 to the test orifice position 24c is performed during a performance test for the orifice 24f as described below and is performed by manual operation of the control lever 24g.

The complete interruption position 24d is configured as a position to interrupt all of the ports of the state switching valve 24, namely, the control valve ports (24h, 24h), the actuator ports (24i, 24i) and the test ports (24j, 24j). That is, as shown in FIG. 4B, when switched to the complete interruption position 24d, the state switching valve 24 interrupts the connection between all of the ports (24h, 24h, 24i, 24i, 24j, 24j) and interrupts the supply/discharge oil passages (34a, 34b), the supply/discharge oil passages (35a, 35b), and the test orifice circuit 30 from each other. Note that the switching of the position of the state switching valve 24 to the complete interruption position 24d is performed during a performance test for a hydraulic circuit connecting to the state switching valve 24 and the first actuator 11 as described below and is performed by manually operating the control lever 24g.

Next, a performance test for the orifice 24f in the first control system 13 and a performance test for a hydraulic circuit connecting to the state switching valve 24 and the first actuator 11 in the first control system 13 will be described. In this embodiment, the hydraulic circuit connecting to the state switching valve 24 and the first actuator 11 in the first control system 13 is configured as the hydraulic circuit 44 (see FIG. 2), which includes the supply/discharge oil passages (35a, 35b) and the oil passages (41a, 41b) provided with the check valves (29a, 29b). Note that a performance test for the orifice in the second control system 14 and a performance test for the hydraulic circuit connecting to the state switching valve 27 and the second actuator 12 in the second control system 14 are the same as the performance test for the orifice 24f in the first control system 13 and the performance test for the hydraulic circuit 44, and therefore the description thereof is omitted.

The performance test for the orifice 24f, the performance test for the orifice in the second control system 14, the performance test for the hydraulic circuit 44, and the performance test for the hydraulic circuit connecting to the state switching valve 27 and the second actuator 12 in the second control system 14 are executed in accordance with the operation performed by the test operator (not shown) and the control performed by the flight controller 43. As shown in FIG. 1, in the flight controller 43, a performance test execution portion 43a is composed of a CPU and a program stored in a memory, and the memory constitutes a storage portion 43b.

The performance test execution portion 43a executes a performance test for the orifice 24f, a performance test for the orifice of the second control system 14, a performance test for the hydraulic circuit 44 and a performance test for the hydraulic circuit connecting to the state switching valve 27 and the second actuator 12 in the second control system 14, in accordance with a command input operation performed by the test operator. The storage portion 43b stores the information necessary for the performance tests executed by the performance test execution portion 43a and the information acquired during the performance tests executed by the performance test execution portion 43a. Note that the results of testing executed by the performance test execution portion 43a may be, for example, displayed on the screen of to a display device (not shown) connected to the flight controller 43.

The performance test for the orifice 24f in the first control system 13 may be executed, for example, during aircraft maintenance work. To execute this test, for example, a command for executing the performance test for the orifice 24f is input into the flight controller 43 by an input operation by the test operator through an input device (for example, an input touch panel, an input switch, an input pointing device, or the like), which is not shown. Then, in accordance with a command from the flight controller 43, the actuator controller 42a demagnetizes the solenoid valve 25 to switch the solenoid valve 25 to the discharge position 25b, and thereby the pilot pressure oil is discharged from the pilot pressure chamber 24e. Consequently, the state switching valve 24 is switched to the damping position 24b. At this time, in the second control system 14, the solenoid valve 28 is maintained in the supply position 28a and the state switching valve 27 is maintained in the actuator connection position.

In the above-described state, the actuator controller 42b actuates the control valve 26 to switch the paths of the pressure oil supplied to and discharged from each of the pair of oil chambers (20a, 20b) of the second actuator 12, in accordance with a command signal from the performance test execution portion 43a of the flight controller 43. Consequently, the second actuator 12 is controlled to execute a predetermined test operation that has been previously set, and the control surface 100 is driven by the operation of the second actuator 12. At this time, the state switching valve 24 of the first control system 13 has been switched to the damping position 24a, and therefore the first actuator 11 operates so as to follow the driving force of the second actuator 12 that is exerted on the control surface 100. Accordingly, the pressure oil discharged from the pair of oil chambers (16a, 16b) flows so as to pass through the orifice 24f, and thereby the damping function by the orifice 24f is fulfilled.

While the first actuator 11 is operating so as to follow the control surface 100 in a state where the state switching valve 24 is in the damping position 24b, a position detection signal for the rod 15 is input from the position sensor 18 of the first actuator 11 to the flight controller 43. Further, the flight controller 43 is provided with a timer (not shown) for time measurement. Then, the operating speed of the first actuator 11 (i.e., the rate of displacement of the rod 15 with respect to the cylinder 16) is continuously and repeatedly calculated in the performance test execution portion 43a throughout the operation of the first actuator 11, in accordance with a result of position detection for the rod 15 from the position sensor 18 and a result of time measurement with the timer. The data of the operating speed of the first actuator 11 that has been obtained by the repeated calculations performed by the performance test execution portion 43a throughout the operation of the first actuator 11 is stored in the storage portion 43b, together with the time data obtained during the calculations (i.e., time data obtained during acquisition of each operating speed). Consequently, the performance data for the damping function by the orifice 24f during the performance test when the state switching valve 24 is in the damping position 24b is acquired.

Upon completion of the above-described process, the control lever 24g is operated by manual operation performed by the test operator, and thereby the state switching valve 24 is switched from the damping position 24b to the test orifice position 24c (see FIG. 4A). Note that, at the time of switching the control lever 24g by manual operation, a guidance may be provided by the flight controller 43 in the control apparatus 1. In this case, for example, a message indicating the completion of acquisition of the operating speed data for the first actuator 11 in the damping position 24a may be displayed on the screen of a display device connected to the flight controller 43, under the control by the flight controller 43. Then, the test operator that has acknowledged the above-described message may operate the control lever 24g, and thereafter a command to continue the testing may be input into the flight controller 43 by an input operation performed by the test operator through the above-described input device.

As described above, when the state switching valve 24 is switched from the damping position 24b to the test orifice position 24c, the performance test is continued in accordance with a command signal from the performance test execution portion 43a of the flight controller 43. At this time, in the second control system 14, the solenoid valve 28 is maintained in the supply position 28a and the state switching valve 27 is maintained in the actuator connection position. Then, the actuator controller 42b actuates the control valve 26 in accordance with a command signal from the performance test execution portion 43a, thus switching the paths of the pressure oil supplied to and discharged from each of the pair of oil chambers (20a, 20b) of the second actuator 12.

As described above, the second actuator 12 is controlled to execute a predetermined test operation that is the same as the test operation executed in a state where the state switching valve 24 is in the damping position 24b, and the control surface 100 is driven by the operation of the second actuator 12. At this time, the state switching valve 24 of the first control system 13 has been switched to the test orifice position 24c, and therefore the first actuator 11 operates so as to follow the driving force of the second actuator 12 that is exerted on the control surface 100. Accordingly, the pressure oil discharged from the pair of oil chambers (16a, 16b) flows so as to pass through the test orifice 30a, and thereby the damping function by the test orifice 30a is fulfilled.

While the first actuator 11 is operating so as to follow the control surface 100 in a state where the state switching valve 24 is in the test orifice position 24c, a position detection signal for the rod 15 is input from the position sensor 18 of the first actuator 11 to the flight controller 43. Then, the operating speed of the first actuator 11 (i.e., the rate of displacement of the rod 15 with respect to the cylinder 16) is continuously and repeatedly calculated in the performance test execution portion 43a throughout the operation of the first actuator 11, in accordance with a result of position detection for the rod 15 from the position sensor 18 and a result of time measurement with the timer of the flight controller 43. The data of the operating speed of the first actuator 11 that has been obtained by the repeated calculations performed by the performance test execution portion 43a throughout the operation of the first actuator 11 is stored in the storage portion 43b, together with the time data obtained during the calculations (i.e., time data obtained during acquisition of each operating speed). Consequently, the performance data for the damping function by the test orifice 30a during the performance test when the state switching valve 24 is in the test orifice position 24c is acquired.

Upon completion of the above-described process, the operating speed of the first actuator 11 when the state switching valve 24 is in the damping position 24b is compared with the operating speed of the first actuator 11 when the state switching valve 24 is in the test orifice position 24c in the performance test execution portion 43a. At this time, the comparison of the operating speeds of the first actuator 11 is carried out, taking into consideration the change corresponding to the elapsed time since the start of operation of the first actuator 11. For example, the operating speed of the first actuator 11 in the damping position 24b is compared with the operating speed of the first actuator 11 in the test orifice position 24c at the timing at which the elapsed time since the start of operation of the first actuator 11 is the same. Then, the comparison between the operating speeds is performed over a period extending from the start to the end of operation of the first actuator 11.

From the above-described comparison, for example, the performance test execution portion 43a determines whether the speed gap (the value of the amount of deviation between the operating speeds) between the operating speed of the first actuator 11 in the damping position 24b and the operating speed of the first actuator 11 in the test orifice position 24c exceeds a predetermined threshold. If there is any operating speed data in which the above-described speed gap exceeds the predetermined threshold from the start to the end of operation of the first actuator 11, the performance test execution portion 43a may determine, for example, that there is the possibility that the performance degradation of the orifice 24f proceeds to impair the normal damping function, and may display the result of determination on the screen of the display device as a test result.

Note that the performance test execution portion 43a may display a different form of indication on the screen of the display device as a test result, rather than performing the above-described determination. For example, it is possible to make a graph on which the change in operating speed of the first actuator 11 in the damping position 24b and the change in operating speed of the first actuator 11 in the test orifice position 24c are superimposed on the same time axis representing the elapsed time since the start of operation of the first actuator 11 and display the graph on the screen of the display device as a comparison result. As the result of comparison between the operating speed of the first actuator 11 in the damping position 24b and the operating speed of the first actuator 11 in the test orifice position 24c, if the flight controller 43 or the test operator determines that there is the possibility that the performance degradation of the orifice 24f proceeds to impair the normal damping function, measures such as replacement of the state switching valve 24 will be taken.

As described above, in the control apparatus 1, in a state where the control surface 100 is driven by the second actuator 12, which is one of the plurality of actuators (11, 12), a performance test for the orifice 24f is executed in the first control system 13 under test that corresponds to the other first actuator 11, which is different from the second actuator 12 that drives the control surface 100. Then, the performance test for the orifice 24f in the control apparatus 1 is executed by comparing the operating speed of the first actuator 11 when the state switching valve 24 is switched to the damping position 24b with the operating speed of the first actuator 11 when the state switching valve 24 is switched to the test orifice position 24c for the first control system 13 under test and the first actuator 11 corresponding to the first control system 13.

Although not described in detail in this embodiment due to redundancy with the description of the performance test for the orifice 24f of the first control system 13, a performance test for the orifice of the second control system 14 is executed in the same manner. That is, in the control apparatus 1, in a state where the control surface 100 is driven by the first actuator 11, which is one of the plurality of actuators (11, 12), a performance test for the orifice 24f is executed in the second control system 14 under test that corresponds to the other second actuator 12, which is different from the first actuator 11 that drives the control surface 100. Then, the performance test for the orifice of the second control system 14 in the control apparatus 1 is executed by comparing the operating speed of the second actuator 12 when the state switching valve 27 is switched to the damping position with the operating speed of the second actuator 12 when the state switching valve 27 is switched to the test orifice position for the second control system 14 under test and the second actuator 12 corresponding to the second control system 14.

Next, a performance test for the hydraulic circuit 44 of the first control system 13 will be described. The performance test for the hydraulic circuit 44 is executed during aircraft maintenance work, for example. At the time of execution of this test, for example, a command for execution of the performance test for the hydraulic circuit 44 is input into the flight controller 43 by an input operation performed by the test operator through the above-described input device. Then, in accordance with a command from the flight controller 43, the actuator controller 42a demagnetizes the solenoid valve 25 to switch the solenoid valve 25 to the discharge position 25b, and thereby the pilot pressure oil is discharged from the pilot pressure chamber 24e. Consequently, the state switching valve 24 is in the state of being switched to the damping position 24b. At this time, in the second control system 14, the solenoid valve 28 is maintained in the supply position 28a and the state switching valve 27 is maintained in the actuator connection position.

In the above-described state, the control lever 24g is operated by manual operation performed by the test operator, and thereby the state switching valve 24 is switched from the damping position 24b via the test orifice position 24c to the complete interruption position 24d (see FIG. 4B). When the state switching valve 24 is switched to the complete interruption position 24d, the performance test is continued in accordance with a command signal from the performance test execution portion 43a of the flight controller 43. Then, the actuator controller 42b actuates the control valve 26 in accordance with a command signal from the performance test execution portion 43a, and thereby the paths of the pressure oil supplied to and discharged from each of the pair of oil chambers (20a, 20b) in the second actuator 12.

As described above, the second actuator 12 operates so as to drive the control surface 100. However, the state switching valve 24 of the first control system 13 is switched to the complete interruption position 24d at this time, and therefore, if the hydraulic circuit 44 is operating normally, the first actuator 11 will not operate so as to follow the driving force of the second actuator 12 that is exerted on the control surface 100 and will remain stopped. Accordingly, if the hydraulic circuit 44 operates normally, the control surface 100 will also remain stopped.

On the other hand, if any abnormality such as a failure occurs in the hydraulic circuit 44, for example, in the case where leakage or the like occurs in at least one of the check valves (29a, 29b), the normal operation of the hydraulic circuit 44 cannot be ensured. In such a case, for example, the first actuator 11 operates so as to gradually follow the driving force of the second actuator 12 that is exerted on the control surface 100. Accordingly, the control surface 100 cannot be maintained in the stopped state and thus will move. Therefore, in the above-described performance test for the hydraulic circuit 44, whether the normal operation of the hydraulic circuit 44 is ensured is checked by determining whether the control surface 100 is stopped. If it is determined that the normal operation of the hydraulic circuit 44 is not ensured, measures such as replacement of the check valves (29a, 29b) will be taken.

Note that whether the control surface 100 is stopped may be determined by the test operator by visual confirmation, or may be determined by the flight controller 43 with the performance test execution portion 43a. In the case where whether the control surface 100 is stopped is determined by the flight controller 43, a position detection signal for the rod 15 is input into the flight controller 43 from the position sensor 18 of the first actuator 11 while the control valve 26 is operating in accordance with a command signal from the performance test execution portion 43a and the supply and discharge paths of the pressure oil to and from the second actuator 12 are being switched. Then, the performance test execution portion 43a determines, for example, whether the value of variation of a result of position detection for the rod 15 falls within a predetermined threshold range throughout operation of the control valve 26. If the value of variation of a result of position detection for the rod 15 is smaller than or equal to the predetermined threshold, it is determined that the control surface 100 is stopped. If the value exceeds the predetermined threshold, it is determined that the control surface 100 is moving. The result of this determination is displayed on the screen of the display device as a test result. In addition, in this case, a graph of results of position detection for the rod 15 during operation of the control valve 26 may also be displayed on the screen of the display device.

As described above, in the control apparatus 1, in a state where pressure oil is supplied to the second actuator 12, which is one of the plurality of actuators (11, 12), a performance test for the hydraulic circuit 44 is executed in the first control system 13 under test that corresponds to the other first actuator 11, which is different from the second actuator 12 to which the pressure oil is supplied. Then, the performance test for the hydraulic circuit 44 in the control apparatus 1 is executed by determining whether the control surface 100 is stopped.

As described above, with the control apparatus 1, the state switching valves (24, 27) that switch the operating state of the actuators (11, 12) are configured such that their positions can be switched between the actuator connection position, the damping position, and the test orifice position to provide communication between each of the actuators and the test orifice circuit including the test orifice. Then, a performance test for the orifice is executed by comparing the operating speed of the actuator (11 or 12) when the state switching valve (24 or 27) is switched to the damping position with the operating speed of the actuator (11 or 12) when the state switching valve (24 or 27) is switched to the test orifice position. Accordingly, it is not necessary to install test pressure sensors respectively corresponding to the ports of the pairs of oil chambers (16a and 16b, 20a and 20b) of the actuators (11, 12), and therefore it is possible to suppress an increase in the number of sensors. Also, signal wiring and a processing unit for determining whether the operation is normal by acquiring and processing signals from test pressure sensors will not be required in the first place, making it possible to suppress an increase in complexity of the mechanism for testing the operation of the control systems (13, 14) of the actuators (11, 12). This can lead to reduced costs. Furthermore, the test orifice serving as the reference for determining the normal operation can be directly used to determine whether the operation is normal, and therefore it is possible to obtain a highly reliably test result.

Therefore, according to this embodiment, it is possible to provide an aircraft actuator control apparatus 1 with which it is possible to suppress an increase in the number of sensors and an increase in complexity of the mechanism for testing the operation of the control systems (13, 14) that control the actuators (11, 12), and also increase the reliability of test results.

With the control apparatus 1, in a state where the state the switching valves (24, 27) are switched to the damping position, each of the pairs of oil chambers (16a and 16b, 20a and 20b) are connected to each other via the orifice. Accordingly, the damping function of causing the actuators (11, 12) to follow an external force exerted on the control surface 100 is fulfilled efficiently. Accordingly, it is possible to achieve an aircraft actuator control apparatus 1 with which it is possible to increase the reliability of a performance test for the orifice in the state switching valve (24, 27) that can efficiently fulfill the damping function, thus suppressing an increase in the number of sensors and an increase in complexity of the test mechanism.

With the control apparatus 1, the operation for switching to the test orifice position is performed by manual operation using the control lever in the switching valves (24, 27). Accordingly, a performance test for the orifice can be easily and reliably executed by manual operation.

With the control apparatus 1, the state switching valves (24, 27) are configured such that their positions can be switched to the complete interruption position to interrupt all ports, in addition to the actuator connection position, the damping position and the test orifice position. Then, a performance test for the hydraulic circuit connecting to the state switching valve (24 or 27) and the actuator (11 or 12) is executed by determining whether the control surface 100 is stopped when the state switching valve (24 or 27) is switched to the complete interruption position. Accordingly, in addition to a performance test for the orifice, a performance test for the hydraulic circuit connecting to the state switching valve (24 or 27) and the actuator (11 or 12) can also be executed by a simple configuration achieved by providing the state switching valves (24, 27) with the complete interruption position. This makes it possible to determine whether the operation is normal separately for each of the orifice and the hydraulic circuit that connects to the state switching valve (24 or 27) and the actuator (11 or 12), thus obtaining an even more reliable test result.

Although an embodiment of the present invention has been described thus far, the present invention is not limited to the above-described embodiment, and various modifications may be made within the scope recited in the claims. For example, the following modifications are possible.

(1) Although the above embodiment has been described taking, as an example, an aircraft actuator control apparatus including two actuators and two control systems that respectively control the operation of the two actuators, this need not be the case. It is also possible to implement an aircraft actuator control apparatus including three or more actuators and three or more control systems that respectively control the operation of the three or more actuators. In this case as well, as in the above embodiment, each of the control systems includes a control valve, a state switching valve and a test orifice circuit. Also, in a state where a control surface is driven by at least one of the three or more actuators, a performance test for an orifice is executed in the control system under test that corresponds to another actuator that is different from the actuator that drives the control surface. Further, in a state where pressure oil is supplied to at least one of the three or more actuators, a performance test for a hydraulic circuit connecting to the state switching valve and the actuator is executed in the control system under test that corresponds to another actuator that is different from the actuator to which the pressure oil is supplied.

Figure 5:
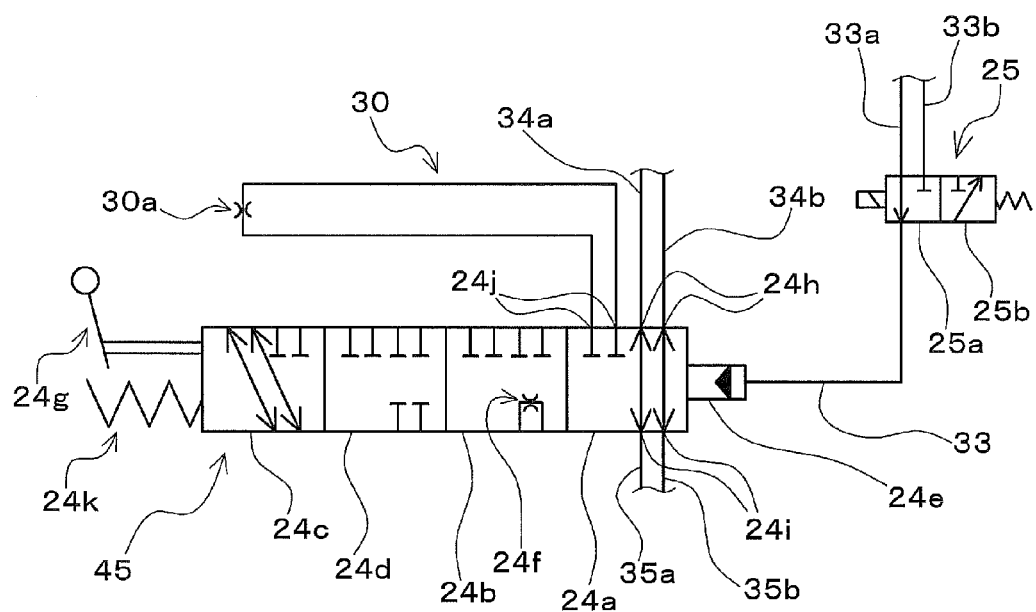
FIG. 5 is a hydraulic circuit diagram showing a state switching valve according to a modification.

(2) Although the above embodiment has been described taking, as an example, a state switching valve configured such that its position is switched between the actuator connection position, the damping position, the test orifice position, and the complete interruption position in this order by sequentially changing the position of its spool from the end where the control lever is provided toward the end where the pilot pressure chamber is provided, this need not be the case. FIG. 5 is a hydraulic circuit diagram showing a state switching valve according to a modification, showing a state switching valve 45 of the first control system 13. Note that the description of those elements configured in the same manner as in the above-described embodiment is omitted by using the same reference numerals in FIG. 5, or by referring to the reference numerals used in the above-described embodiment. Although not shown, in this modification, the second control system 14 is also provided with a state switching valve configured in the same manner as the state switching valve 45.

The state switching valve 45 according to the modification shown in FIG. 5 is different from the state switching valve 24 in the above embodiment with regard to the positions of the test orifice position 24c and the complete interruption position 24d. That is, the state switching valve 45 is configured such that its position is switched between the actuator connection position 24a, the damping position 24b, the complete interruption position 24d and the test orifice position 24c in this order by sequentially changing the position of its spool (not shown) from the end where the control lever 24g is provided toward the end where the pilot pressure chamber 24e is provided. Note that the order of the actuator connection position, the damping position, the test orifice position and the complete interruption position is not limited to the orders described as examples for the state switching valve 24 and the state switching valve 45, and various modification can be made.

Figure 6A:
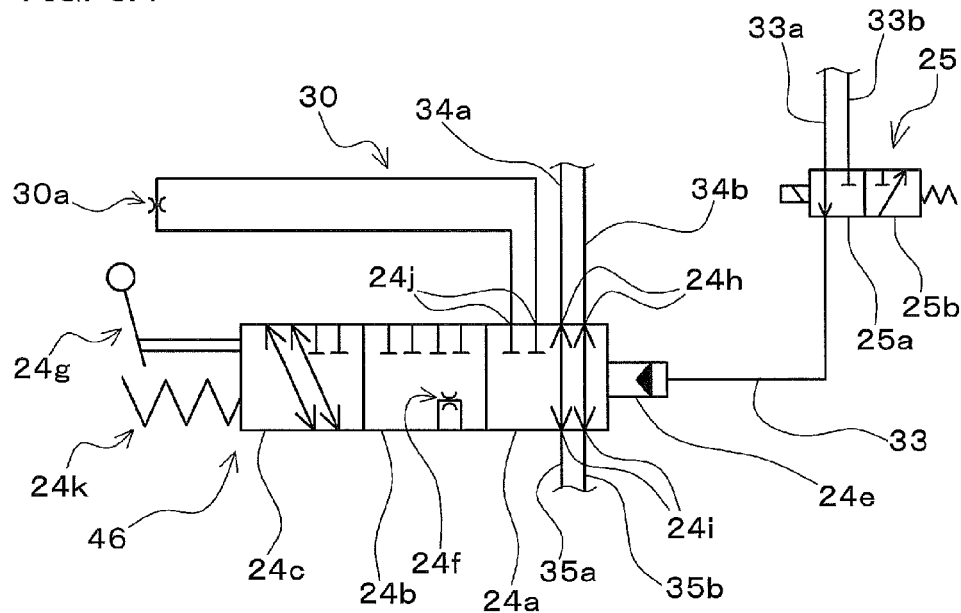
FIG. 6A is a hydraulic circuit diagram showing a state switching valve according to a modification.
Figure 6B:
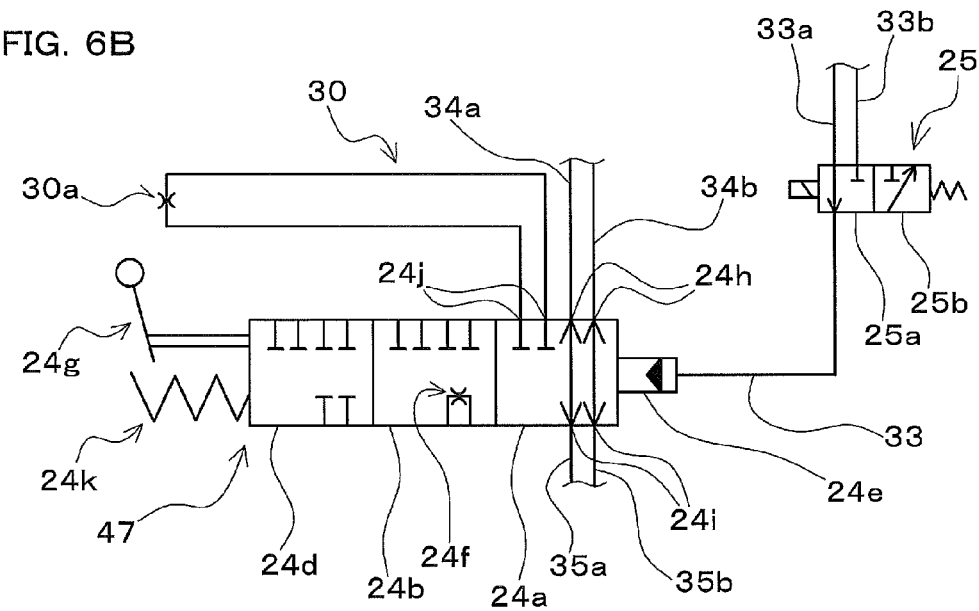
FIG. 6B is a hydraulic circuit diagram showing a state switching valve according to a modification.

(3) FIG. 6 (FIGS. 6A, 6B) are hydraulic circuit diagrams showing state switching valves according to other modifications, showing state switching valves (46, 47) of the first control system 13. FIG. 6A shows the hydraulic circuit diagram of the state switching valve 46, and FIG. 6B shown the hydraulic circuit diagram of the state switching valve 47. Note that the description of those elements configured in the same manner as the above embodiment is omitted by using the same reference numerals in FIG. 6, or by referring to the same reference numerals as in the above embodiment.

The state switching valve 46 according to the modification shown in FIG. 6A is configured such that its position can be switched between the actuator connection position 24a, the damping position 24b and the test orifice position 24c. However, the state switching valve 46 is different from the state switching valve 24 described above in that it is not provided with the complete interruption position 24d. Thus, it is possible to implement a state switching valve 46 that is provided with only the actuator connection position 24a, the damping position 24b and the test orifice position 24c. Although not shown, in this modification, the second control system 14 is also provided with a state switching valve configured in the same manner as the state switching valve 46.

The state switching valve 47 according to the modification shown in FIG. 6B is configured such that its position can be switched between the actuator connection position 24a, the damping position 24b and the complete interruption position 24d. Although not shown, the second control system 14 is also provided with a state switching valve (this state switching valve as well is referred to as a "state switching valve 47") configured in the same manner as the state switching valve 47. However, the state switching valves (47, 47) are different from the state switching valves (24, 27) described above in that they are not provided with the test orifice position 24c. An aircraft actuator control apparatus provided with the state switching valves (47) is different from the aircraft actuator control apparatus 1 described above also in that it is not provided with the test orifice circuit. In this modification, by supply of pressure oil to one of the plurality of actuators (11, 12), a performance test for the hydraulic circuit connecting to the state switching valve 47 and the actuator (11 or 12) is executed in the control system (13 or 14) corresponding to another actuator (the other of the actuators 11 and 12) that is different from the actuator (one of the actuators 11 and 12) that drives the control surface 100. Also, the above-mentioned performance test for the hydraulic circuit is executed by determining whether the control surface 100 is stopped.

According to this modification, the state switching valves 47 that switch the operating state of the actuators (11, 12) are configured such that their position can be switched between the actuator connection position 24a, the damping position 24b, and the complete interruption position 24d that interrupts all of the ports (24h, 24h, 24i, 24i). Then, a performance test for the hydraulic circuit connecting to the state switching valve 47 and the actuator (11 or 12) is executed by determining whether the control surface 100 is stopped when the state switching valve 47 is switched to the complete interruption position 24d. Accordingly, a performance test for the hydraulic circuit connecting to the state switching valve 47 and the actuator (11 or 12) can be executed by a simple configuration achieved by providing the state switching valve 47 with the complete interruption position 24d. Accordingly, it is not necessary to install test pressure sensors respectively corresponding to the ports of the pairs of oil chambers (16a and 16b, 20a and 20b) of the actuators (11, 12), and therefore it is possible to suppress an increase in the number of sensors. Also, signal wiring and a processing unit for determining whether the operation is normal by acquiring and processing signals from test pressure sensors will not be required in the first place, making it possible to suppress an increase in complexity of the mechanism for testing the operation of the control systems (13, 14) of the actuators (11, 12). This can lead to reduced costs. Furthermore, whether the operation of the hydraulic circuit connecting to the state switching valve 47 and the actuator (11 or 12) is normal can be directly determined by forcefully interrupting all of the ports (24h, 24h, 24i, 24i), and therefore it is possible to obtain a highly reliably test result.

Figure 7A:
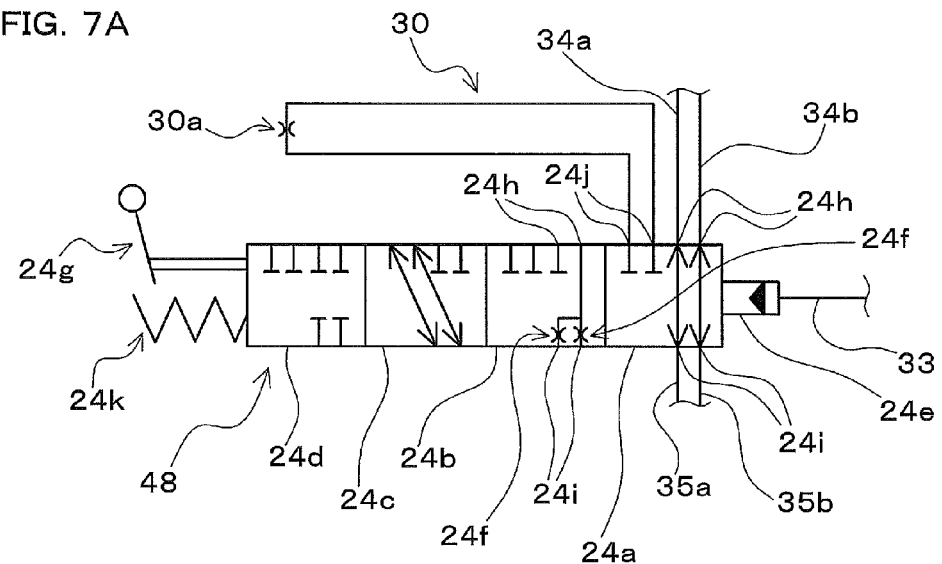
FIG. 7A is a hydraulic circuit diagram showing a state switching valve according to a modification.
Figure 7B:
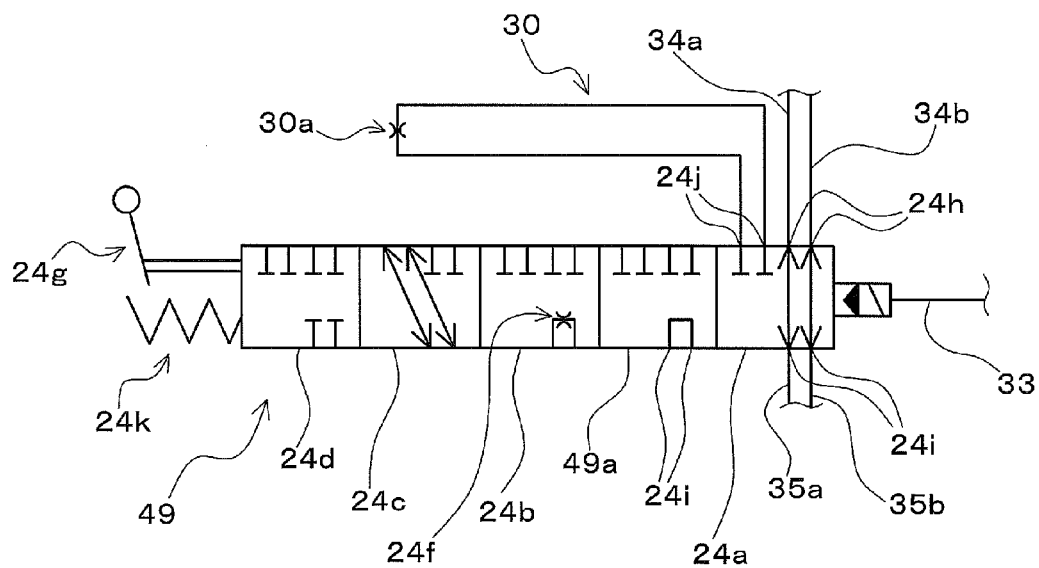
FIG. 7B is a hydraulic circuit diagram showing a state switching valve according to a modification.

(4) FIG. 7 (FIGS. 7A and 7B) are hydraulic circuit diagrams showing state switching valves according to still other modifications, showing hydraulic circuit diagrams of state switching valves (48, 49) of the first control system 13. FIG. 7A shows the hydraulic circuit diagram of the state switching valve 48, and FIG. 7B shows the hydraulic circuit diagram of the state switching valve 49. Note that the description of those elements configured in the same manner as in the above-described embodiment is omitted by using the same reference numerals in FIG. 7, or by referring to the reference numerals used in the above-described embodiment.

The state switching valve 48 according to the modification shown in FIG. 7A is different from the state switching valve 24 of the above-described embodiment with regard to the configuration of the damping position 24b. The state switching valve 48 is configured, when switched to the damping position 24b, to connect the pair of oil chambers (16a, 16b) of the first actuator 11 to the oil discharge system (in this modification, the supply/discharge oil passage 34b) of the control valve 23 via the orifices (24f, 24f). That is, in a state where the state switching valve 48 is switched to the damping position 24b, the actuator ports (24i, 24i) respectively connected to the supply/discharge oil passages (35a, 35b) are in communication with one of the control valve ports (24h, 24h) (the control valve port 24h connecting to the supply/discharge oil passage 34b) via the orifices 24f. Note that in a state where the state switching valve 48 is switched to the damping position 24b, the control valve 23 is maintained in the state of being switched to the first switching position 23b, and thereby the connected state between the supply/discharge oil passage 34b and the discharge oil passage 32 is maintained.

Although not shown, in this modification, the second control system 14 is also provided with a state switching valve (this state switching valve as well is referred to as a "state switching valve 48") configured in the same manner as the state switching valve 48. According to this modification, as in the above-described embodiment, in a state where the state switching valves 48 are switched to the damping position 24b, the damping function of causing the actuators (11, 12) to follow an external force exerted on the control surface 100 is efficiently fulfilled.

The state switching valve 49 according to the modification shown in FIG. 7B is different from the state switching valve 24 of the above-described embodiment in that it is further provided with a bypass position 49a. The state switching valve 49 is configured such that its position is switched between the actuator connection position 24a, the bypass position 49a, the damping position 24b, the test orifice position 24c and the complete interruption position 24d in this order by sequentially changing the position of its spool (not shown) from the end where the control lever 24g is provided toward the end where the pilot pressure chamber 24e is provided. Further, the state switching valve 49 is configured such that its position can be switched between the actuator connection position 24a, the bypass position 49a and the damping position 24b by switching between the magnetized state and the demagnetized state of its solenoid and switching between the supply and the discharge of the pilot pressure oil. Also, the state switching valve 49 is configured such that its position can be switched between the test orifice position 24c and the complete interruption position 24d by manual operation of the control lever 24g.

Furthermore, the bypass position 49a is configured as a position to provide communication between the pair of oil chambers (16a, 16b) by connection, without causing the oil chambers (16a, 16b) to pass through the orifices 24f as in the damping position 24b. That is, in a state where the state switching valve 49 is switched to the bypass position 49a, the actuator ports (24i, 24i) respectively connected to the supply/discharge oil passages (35a, 35b) are in communication with each other without passing through any orifice. Although not shown, in this embodiment, the second control system 14 is also provided with a state switching valve configured in the same manner as the state switching valve 49. Note that the order of the actuator connection position, the bypass position, the damping position, the test orifice position and the complete interruption position are not limited to the orders described as an example for the state switching valve 49, and various modification can be made.

The present invention can be widely applied as an aircraft actuator control apparatus that includes a plurality of hydraulically operated actuators that drive a control surface of an aircraft and a plurality of control systems that respectively controls the operation of the plurality of actuators. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. An aircraft actuator control apparatus comprising: a plurality of hydraulically operated actuators that drive a control surface of an aircraft; and a plurality of control systems that respectively control operation of the plurality of actuators, wherein each of the plurality of control systems comprises:

a control valve that controls operation of a corresponding actuator by switching a path of pressure oil that is supplied to and discharged from each of a pair of oil chambers of the actuator;

a state switching valve that is installed between the control valve and the corresponding actuator so as to provide communication between the control valve and the actuator, that includes an orifice that can be in communication with the pair of oil chambers, and that switches an operating state of the actuator; and a test orifice circuit that includes a test orifice used for testing a performance of the orifice and that can be in communication with the actuator via the state switching valve, the state switching valve is provided such that its position can be switched between:

an actuator connection position to connect the actuator to the control valve so as to allow the pressure oil to flow between each of the pair of oil chambers and the control valve;

a damping position to allow the pressure oil discharged from each of the pair of oil chambers to pass through the orifice; and a test orifice position to provide communication between each of the pair of oil chambers and the test orifice circuit so as to allow the pressure oil discharged from each of the pair of oil chambers to pass through the test orifice, in a state where the control surface is driven by at least one of the plurality of actuators, a performance test for the orifice can be executed in a the control system of under test that corresponds to another one of the actuators that is different from said corresponding the actuator that drives the control surface, and the performance test for the orifice can be executed by comparing, for the control system under test and the actuator corresponding thereto, an operating speed of the actuator when the state switching valve is switched to the damping position with an operating speed of the actuator when the state switching valve is switched to the test orifice position.

2. The aircraft actuator control apparatus according to claim 1, wherein, when switched to the damping position, the state switching valve connects the pair of oil chambers to each other so as to provide communication between the pair of oil chambers via the orifice, or connects the pair of oil chambers to an oil discharge system in the control valve via the orifice.

3. The aircraft actuator control apparatus according to claim 1, wherein the state switching valve is provided with a control lever for switching between positions by manual operation, and an operation of switching to the test orifice position can be performed by manual operation of the control lever.

4. The aircraft actuator control apparatus according to claim 1, wherein the state switching valve is provided such that its position can also be switched to a complete interruption position where all control valve ports in communication with the control valve, actuator ports in communication with the pair of oil chambers of the actuator, and test ports in communication with the test orifice circuit are all interrupted, in a state where the pressure oil is supplied to one of the plurality of actuators, a performance test for a hydraulic circuit connecting a state switching valve of another one of the actuators that is different from the actuator to which the pressure oil is supplied is executed in the control system under test that corresponds to said another one of the actuators, and the performance test for the hydraulic circuit can be executed by determining whether the control surface is stopped.

5. An aircraft actuator control apparatus comprising: a plurality of hydraulically operated actuators that drive a control surface of an aircraft; and a plurality of control systems that respectively control operation of the plurality of actuators, wherein each of the plurality of control systems comprises:

a control valve that controls operation of a corresponding actuator by switching a path of pressure oil that is supplied to and discharged from each of a pair of oil chambers of the actuator, where the control valve is provided with a neutral position where the path of pressure oil through the control valve is completely interrupted; and a state switching valve that is installed between the control valve and the corresponding actuator so as to provide communication between the control valve and the actuator, that includes an orifice that can be in communication with the pair of oil chambers, and that switches an operating state of the actuator;

the state switching valve is provided such that its position can be switched between:

an actuator connection position to connect the actuator to the control valve so as to allow the pressure oil to flow between each of the pair of oil chambers and the control valve;

a damping position to allow the pressure oil discharged from each of the pair of oil chambers to pass through the orifice; and a complete interruption position where control valve ports in communication with the control valve and actuator ports in communication with the pair of oil chambers of the actuator are all interrupted, by supply of the pressure oil to at least one of the plurality of actuators, a performance test for a hydraulic circuit connecting to a state second switching valve of another one of the actuators that is different from the actuator that drives the control surface can be executed in the control system under test that corresponds to said another one of the actuators, and the performance test for the hydraulic circuit can be executed by determining whether the control surface is stopped.

* * * * *